US009479920B1

(12) United States Patent
Mayor

(10) Patent No.: US 9,479,920 B1
(45) Date of Patent: Oct. 25, 2016

(54) POWER MANAGEMENT IN CROWD-SOURCED LOST-AND-FOUND SERVICE

(71) Applicant: Apple Inc., Cupertino, CA (US)

(72) Inventor: Robert Mayor, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/871,809

(22) Filed: Sep. 30, 2015

(51) Int. Cl.
- *H04B 7/00* (2006.01)
- *H04W 8/00* (2009.01)
- *H04W 52/02* (2009.01)
- *H04W 4/00* (2009.01)
- *H04W 4/02* (2009.01)
- *H04W 84/12* (2009.01)

(52) U.S. Cl.
CPC ............. *H04W 8/005* (2013.01); *H04W 4/008* (2013.01); *H04W 4/023* (2013.01); *H04W 52/0209* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 6,150,987 A * | 11/2000 | Sole | ......................... | H01Q 3/02 343/757 |
| 7,171,223 B2 * | 1/2007 | Herscovich | ............ | H04B 7/061 455/101 |
| 8,055,259 B1 * | 11/2011 | Sigg | ...................... | H04M 15/50 379/112.01 |
| 8,972,605 B2 * | 3/2015 | Fletcher | ................ | H04W 12/02 455/456.1 |
| 9,048,528 B1 * | 6/2015 | Lee | .......................... | H01Q 5/30 |
| 9,253,647 B2 * | 2/2016 | Bontu | ................... | H04W 16/14 |
| 9,337,539 B1 * | 5/2016 | Ananthanarayanan | ..................... | H01Q 5/335 |
| 2004/0160370 A1 * | 8/2004 | Ghosh | .................... | G06F 1/1616 343/702 |
| 2005/0147071 A1 * | 7/2005 | Karaoguz | ............. | H04W 88/06 370/338 |
| 2007/0275718 A1 * | 11/2007 | Descombes | ........... | H04M 3/229 455/435.1 |
| 2008/0117850 A1 * | 5/2008 | Agrawal | ............... | H04W 88/06 370/311 |
| 2009/0210141 A1 * | 8/2009 | Young | .................. | G08G 1/0104 701/119 |
| 2009/0323652 A1 * | 12/2009 | Chen | ...................... | H04B 1/406 370/338 |
| 2012/0315839 A1 * | 12/2012 | Mumcuoglu | ........... | H04W 4/02 455/2.01 |
| 2014/0043979 A1 * | 2/2014 | Etemad | ................ | H04B 7/2656 370/237 |
| 2014/0379369 A1 * | 12/2014 | Kokovidis | ............. | A61B 5/002 705/2 |
| 2015/0017909 A1 | 1/2015 | Meunier et al. | | |
| 2015/0341333 A1 * | 11/2015 | Feng | ....................... | H04L 63/08 713/168 |
| 2016/0157214 A1 * | 6/2016 | Marsh | ..................... | H04W 4/00 370/329 |

FOREIGN PATENT DOCUMENTS

| | | |
|---|---|---|
| WO | WO 2014/023011 | 2/2014 |
| WO | WO 2014/203247 | 12/2014 |

* cited by examiner

*Primary Examiner* — Dominic Rego
(74) *Attorney, Agent, or Firm* — Fish & Richardson P.C.

(57) ABSTRACT

Power management techniques for crowd-sourced lost-and-found service are described. A mobile device participating in the crowd-sourced lost-and-found service can monitor signals from an electronic tag using a first subsystem that has low power consumption. The mobile device can monitor wireless signals from wireless access points (APs) using a second subsystem that has low power consumption. Identifiers of detected tags and APs are stored locally in the respective subsystems. At pre-specified intervals, the subsystems can submit the stored identifiers to an application processor of the mobile device. The application processor can be activated to determine the location of the tags using known location of the APs. The application processor can be deactivated after the location of the tags are determined. The mobile device can then submit the location to a remote server. The remote server can provide the location to an owner of an item attached to the tag.

20 Claims, 7 Drawing Sheets

POWER MANAGEMENT IN CROWD-SOURCED LOST-AND-FOUND SERVICE

TECHNICAL FIELD

This disclosure relates generally to providing location-based services on a mobile device.

BACKGROUND

People often misplace or otherwise lose their personal belongings such as keys, backpacks, or laptop computers. One way to find a misplaced or lost item is to attach an electronic tag, or simply referred to as a tag, to the item beforehand. The electronic tag can be a device that emits a low-energy wireless signal. A user of a computing device can use the computing device to track where the tag and the item attached to the tag are located. For example, the computing device can detect the tag when the tag is within several meters to the computing device and then alert the user of the presence of the item. If the computing device is located farther away from the tag, the computing device can request a lost-and-found service to provide a last known location of the tag. The lost-and-found server can use crowd-sourced data to determine the last known location, thereby helping the user to find the tagged item. Crowd sourcing can include monitoring signals from the tag by many mobile devices. Monitoring signals from the tag by many mobile device can consume power of the mobile devices without providing an obvious benefit to most owners of the mobile devices. For this reason, people may not wish to participate in the monitoring of the tag. Low participation in crowd sourcing can result in inaccurate or outdated information on where the tag and the item are located.

SUMMARY

Power management techniques for crowd-sourced lost-and-found service are described. A mobile device participating in the crowd-sourced lost-and-found service can monitor signals from an electronic tag using a first subsystem that has low power consumption. The mobile device can monitor wireless signals from wireless access points (APs) using a second subsystem that has low power consumption. Identifiers of detected tags and APs are stored locally in the respective subsystems. At pre-specified intervals, the subsystems can submit the stored identifiers to an application processor of the mobile device. The application processor can be activated to determine the location of the tags using known location of the APs. The application processor can be deactivated after the location of the tags are determined. The mobile device can then submit the location to a remote server. The remote server can provide the location to an owner of an item attached to the tag.

The features described in this specification can achieve one or more advantages. For example, a mobile device implementing the techniques described in this specification can monitor a location of an electronic tag using less power than a conventional mobile device uses. Power consumption of the microchips uses to monitor the signals can be significantly lower than power consumption of an application processor. The application processor is activated only infrequently and briefly. Accordingly, monitoring tags can be achieved without significant battery drain. Less battery drain puts less burden on the device and on the user using the device to participate in a crowd-sourced lost-and-found service. As a result, more people may be willing to participate, resulting in a better service.

The details of one or more implementations of the subject matter are set forth in the accompanying drawings and the description below. Other features, aspects, and advantages of the subject matter will become apparent from the description, the drawings and the claims.

BRIEF DESCRIPTION OF THE DRAWINGS

Like reference symbols in the various drawings indicate like elements.

DETAILED DESCRIPTION

Exemplary Crowd-Sourced Lost-and-Found Service

Figure 1:
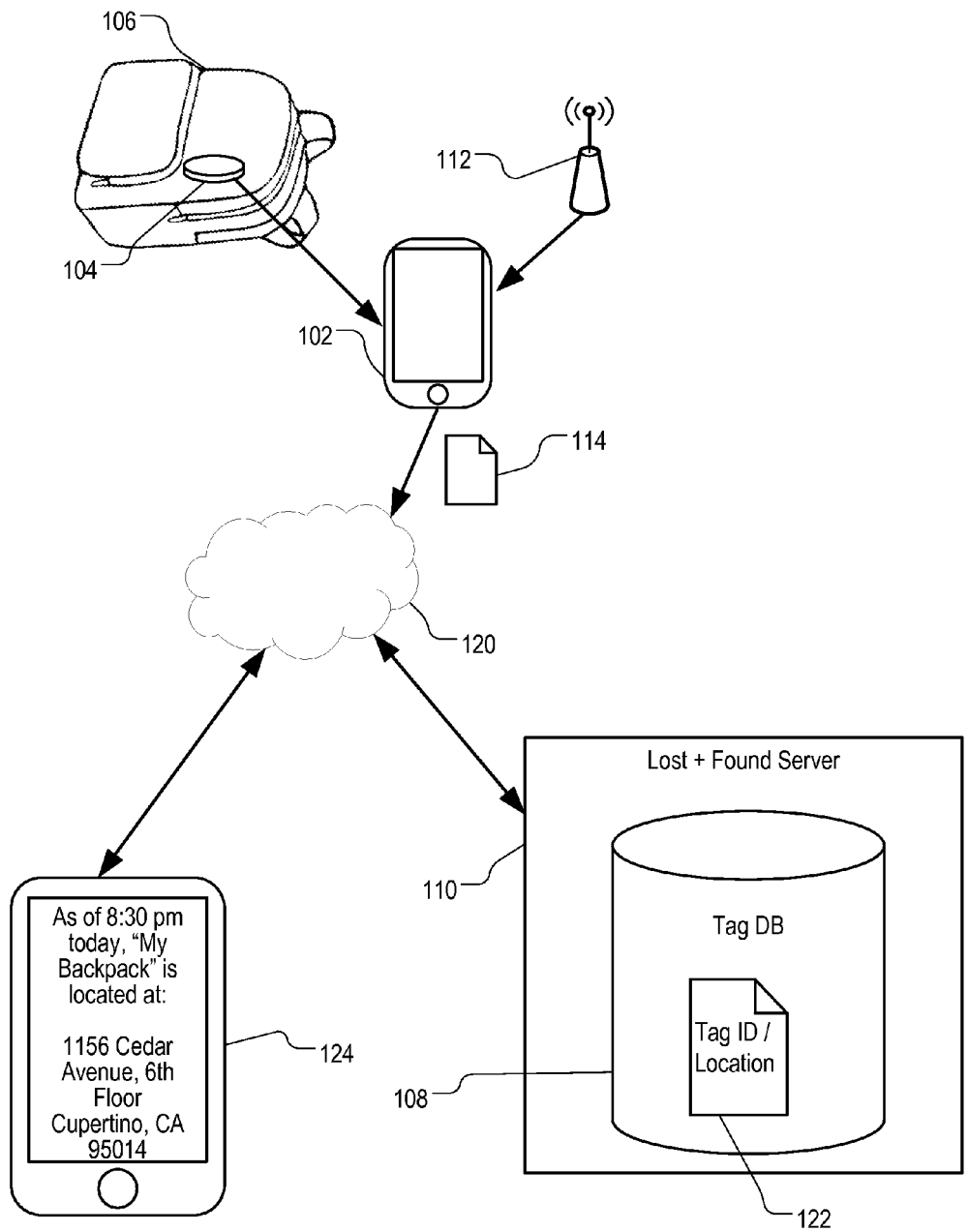
FIG. 1 is a diagram illustrating an exemplary crowd-sourced lost-and-found service.

FIG. 1 is a diagram illustrating an exemplary crowd-sourced lost-and-found service. In the crowd-sourced lost-and-found service, multiple mobile devices can participate in the crowd sourcing. For simplicity, FIG. 1 is showing only mobile device 102.

A user who wishes to use the lost-and-found service may attach electronic tag 104 to item 106 in order to locate item 106 in case item 106 is lost or stolen. Electronic tag 104 can be a wireless signal source that emits a signal that is detectable within a few meters. An example of electronic tag 104 is a Bluetooth™ low energy (BLE) beacon that emits a signal periodically. The signal can include an identifier of electronic tag 104. The identifier can be a universally unique identifier (UUID) that is associated with electronic tag 104. The user can associate a label with the identifier. The label (e.g., "My Backpack") can identify or describe item 106 to which electronic tag 104 is attached. The user can register electronic tag 104 with the lost-and-found service for monitoring by mobile devices participating in the lost-and-found service. The identifier can be stored in tag database 108 of server 110 providing the lost-and-found service. Server 110 can include one or more computer processors and storage devices.

Mobile device 102 participating in the crowd-sourced lost-and-found service can be configured to monitor electronic tags including electronic tag 104. A component that uses less power than an application processor of mobile device does can perform the monitoring. An example of this component is a Bluetooth receiver microchip. A second low power-consumption component of mobile device can monitor other signal sources that have known locations. These signal sources can include, for example, wireless access point (AP) 112. The second low power-consumption component can include a wireless communication microchip. The Mobile device 102 can store a location of AP 112 in a location database of mobile device 102. A location server can provide the location to mobile device. The location can be associated with an identifier of AP 112. The identifier can be a media access control (MAC) address of AP 112.

The wireless communication subsystem of mobile device 102 can detect a signal of AP 112. The signal may include the identifier of AP 112. The application processor of 102 can be activated periodically (e.g., every 30 minutes) to process various identifiers received by mobile device 102. The application processor can determine that time T1 of receiving the identifier of electronic tag 104 coincides with time T2 of receiving the identifier of AP 112. The application processor can estimate a location of electronic tag 104 based on the known location of AP 112. For example, if T1 is the same as T2, the application processor can designate the known location of AP 112 as the location of electronic tag 104 with high certainty. If T1 is X minutes before or after T2, the application processor can designate the know location of AP 112 as the location of electronic tag 104 with low certainty. A larger temporal difference can correspond to lower certainty.

Mobile device 102 can submit estimated location 114 associated with the identifier of electronic tag 104 to server 110 through communications network 120. Server 110 can store an association 122 of the identifier and the estimated location 114 in tag database 108 as a last know location of electronic tag 104. Upon receiving another submission of the identifier and an estimated location at a later time, server 110 can update tag database 108 to reflect the latest location.

The user who registered electronic tag 104 may inquire the location of item 106 using computing device 124. Computing device 124 can be a mobile device or a desktop computer connected to server 110 through communications network 120. Computing device 124 can display labels of electronic tags registered by the user, including the label "My Backpack" associated with electronic tag 104. During inquiry, computing device 124 can submit a location request to server 110. The location request can include the identifier of electronic tag 104. Upon receiving the location request and authenticating the user, server 110 can provide the estimated location of electronic tag 104 to computing device 124. The estimated location can be associated with a timestamp indicating time at which electronic tag 104 was detected. The location can include latitude, longitude and altitude coordinates. Upon receiving the location and timestamp, computing device 124 can display the location and timestamp to the user in various forms. For example, computing device 124 can display the location as coordinates, as an address, or as a marker on a map.

Exemplary Device Components

Figure 2:
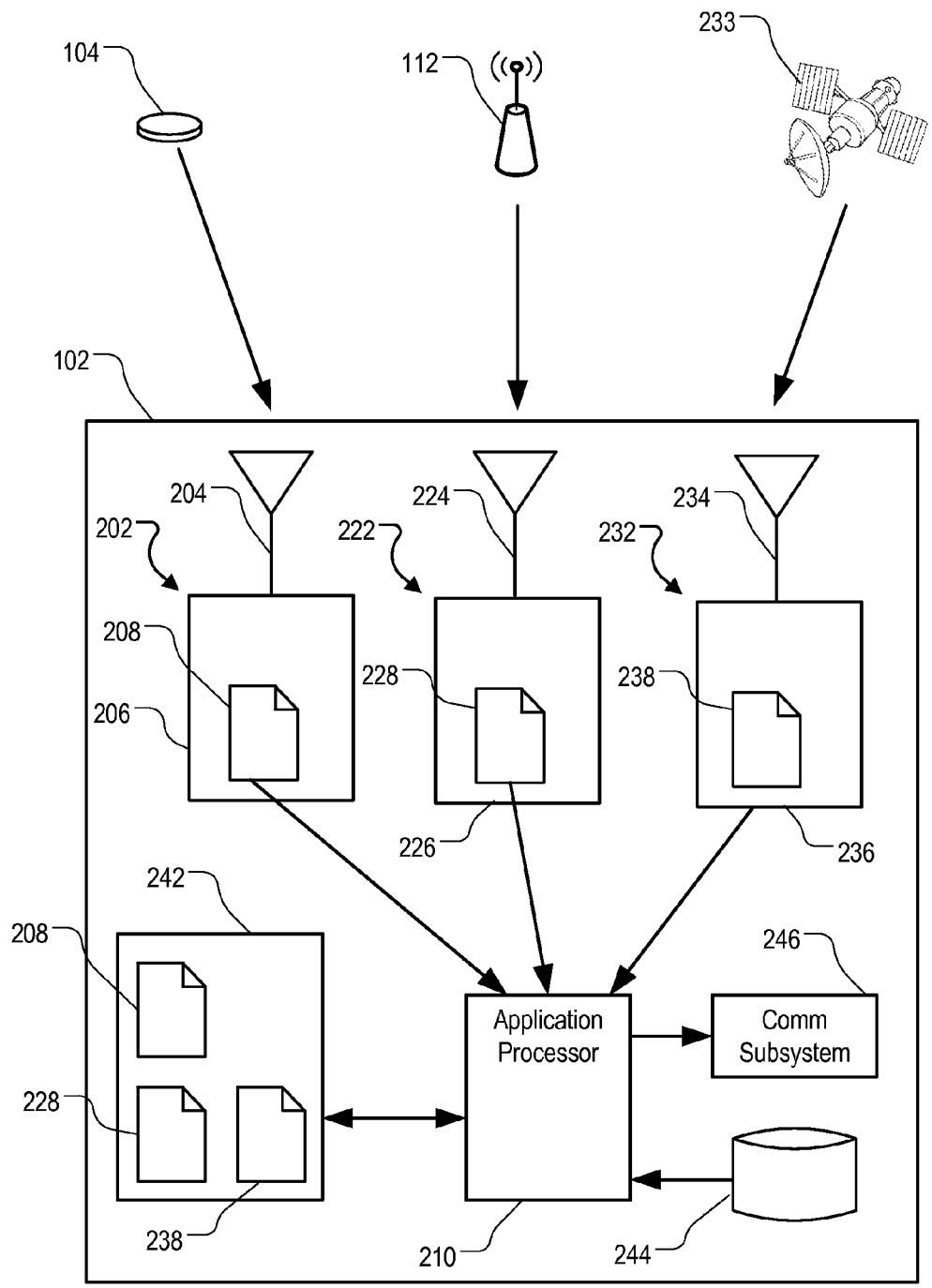
FIG. 2 is a block diagram illustrating an exemplary mobile device participating in a crowd-sourced lost-and-found service.

FIG. 2 is a block diagram illustrating exemplary mobile device 102 participating in a crowd-sourced lost-and-found service. Mobile device 102 can include first wireless subsystem 202 configured to monitoring wireless signals on a given frequency and detect electronic tags working in that frequency. For example, first wireless subsystem 202 can be a microchip configured to monitor wireless signals in the industrial, scientific and medical (ISM) radio bands of 2.4 GHz to 2.4835 GHz in which electronic tag 104 operates. First wireless subsystem 202 can be programmed to perform a scan for tags at a fixed or variable interval (e.g., every minute).

First wireless subsystem 202 can include antenna 204 configured to receive wireless signals from a BLE beacon. First wireless subsystem 202 can include a processor for decoding the received wireless signals to determine an identifier of an electronic tag encoded in the signals. First wireless subsystem 202 can include storage device 206 for storing tag identifier list 208. Tag identifier list 208 can include one or more tag identifiers decoded from the received signals and timestamps indicating respective time each tag identifier is first detected.

The processor of first wireless subsystem 202 can be programmed to submit the stored identifiers and associated time to application processor 210 of mobile device 102. After submission, the processor can purge content stored in storage device 206. The submission can be programmed to occur at certain intervals. Application processor 210 can specify the intervals to be fixed intervals (e.g., every 30 minutes) or variable intervals that are functions of identifiers detected by first wireless subsystem 202. For example, application processor 210 can specify a shorter interval when a new tag identifier is detected and a longer interval when tag identifiers in identifier list 208 remain the same.

Mobile device 102 can include second wireless subsystem 222 configured to monitoring wireless signals on a given frequency and detect wireless gateways working in that frequency. For example, first wireless subsystem 202 can be a Wi-Fi™ processor microchip configured to monitor devices built to support IEEE 802.11 standards. The devices that second wireless subsystem 222 is capable of monitoring can include AP 112.

Second wireless subsystem 222 can include antenna 224 configured to receive wireless signals from the IEEE 802.11 devices. Second wireless subsystem 222 can include a processor for decoding the received wireless signals to determine an identifier encoded in the signals. The identifier can be a MAC address of an AP. Second wireless subsystem 222 can include storage device 226 for storing AP identifier list 228. AP identifier list 228 can include one or more MAC addresses decoded from the received signals and timestamps indicating respective time each MAC address is first detected.

The processor of second wireless subsystem 222 can be programmed to submit the stored AP identifiers and associated time to application processor 210 of mobile device 102 in a manner that is similar to the processor of first wireless subsystem 202.

Optionally, mobile device 102 can include location subsystem 232 configured to determine a location of mobile device 102 using signals from global navigation satellite system (GNSS) 233. GNSS 233 can include, for example, GPS, GLONASS or both. Location subsystem 232 can include antenna 234 to receive GNSS signals and a barometer for recording air pressure. Location subsystem 232 can include a processor for decoding the signals and air pressure readings to determine a location and storage device 236 for storing location list 238. Location list 238 can include locations and their respective timestamps. The locations can be represented as latitude coordinates, longitude coordinates and altitude coordinates. Location subsystem 232 can record the location at first programmed intervals (e.g., every minute) and submit location list 238 to application processor 210 at second programmed intervals (e.g., every 30 minutes).

The submissions from first wireless subsystem 202, second wireless subsystem 222 and location subsystem 232 can activate application processor 210. Application processor 210 can be a system on a chip (SoC) configured to execute applications in a mobile operating system. Application processor 210 can store received identifier lists 208 and 228 and received location list 238 (if any) in storage device 242. Application processor 210 can execute a location determination program to estimate a respective location to be associated with each tag identifier in tag identifier list 208.

In some implementations, the location determination program can estimate the location using a respective location associated with each AP identifier. The location determination program can obtain the locations associated with the AP identifiers from location database 244 by performing a lookup. The location determination program can then determine the estimated location of each electronic tag. In some implementations, the location determination program can estimate the respective location to be associated with each tag identifier by collating tag identifier list 208 and location list 238 by timestamp. Application processor 210 can then submit the tag identifiers and associated locations to a server providing the lost-and-found service using communication subsystem 246. The submission can include, for example, a tag identifier, a location including latitude, longitude and altitude coordinates, a timestamp, a certainty value indicating an error margin as determined by the location determination program, a count of number of times the tag identifier has been detected and a count of number of scans performed.

After submission, application processor 210 can return to an inactivated state. Since application processor 210 is activated only infrequently at programmed intervals and since application processor 210 is activated only for a brief time period sufficient to execute the location determination program, power consumption for participating in location determination for the lost-and-found service is negligible. The low power consumption can encourage participation in the crowd-sourced lost-and-found service.

Figure 3:
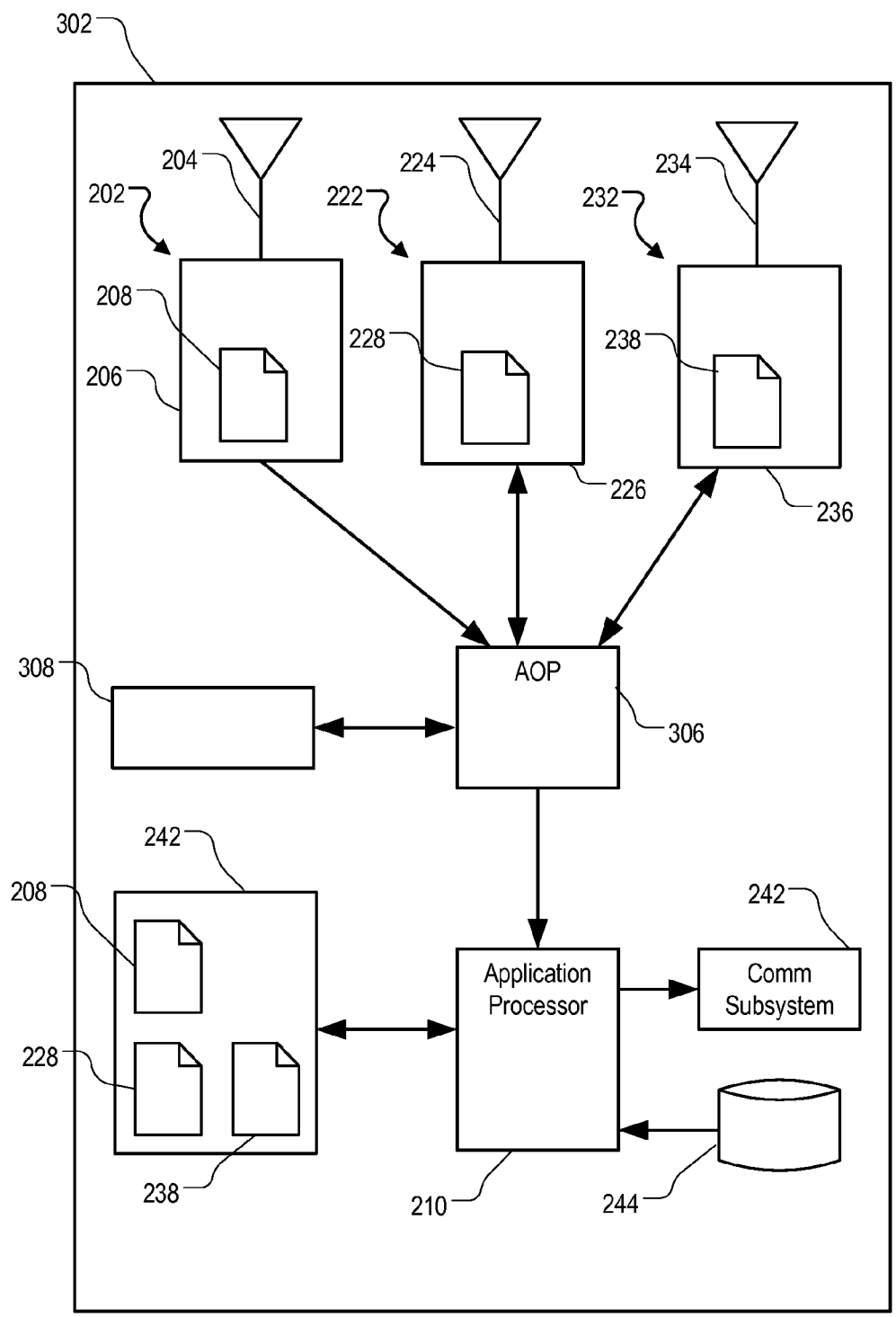
FIG. 3 is a block diagram illustrating an exemplary mobile device participating in a crowd-sourced lost-and-found service.

FIG. 3 is a block diagram illustrating an exemplary mobile device 302 participating in a crowd-sourced lost-and-found service. Mobile device 302 can include the components, and perform the operations, of mobile device 102 of FIG. 1 and FIG. 2. In addition, mobile device 302 can include always-on processor (AOP) 306. AOP 306 can be a processor designed to consume power at a level that is sufficiently low to enable the processor to be always in an active or "on" mode. An example of AOP 306 is a motion processor including one or more accelerometers and gyroscopes.

First wireless subsystem 202 can be programmed to submit tag identifier list 208 to AOP 306 upon detecting a new tag identifier or at given intervals. In response to receiving tag identifier list 208, AOP 306 can send a request to second wireless subsystem 222 to retrieve AP identifier list 228. In some implementations, in response to receiving tag identifier list 208, AOP 306 can trigger second wireless subsystem 222 to perform a wireless scan for APs and to submit results of the scan to AOP 306. Alternatively or additionally, in response to receiving tag identifier list 208, AOP 306 can retrieve location list 238 from location subsystem 232 or trigger location subsystem 232 to perform a satellite scan to determine a location.

AOP 306 can store tag identifier list 208, AP identifier list 228 and location list 238 in storage device 242 or in AOP cache 308. AOP cache 308 can be a storage device that is part of, or coupled to, AOP 306. At specified intervals, AOP 306 can provide data stored in AOP cache 308 to application processor 210. In addition, AOP 306 can submit motion information to application processor 210. Application processor 210 can determine a respective estimated location to be associated with each tag identifier by collating tag identifier list 208, AP identifier list 228 and optionally, location list 238. Application processor 210 can adjust a confidence value of an estimated location using motion information provided by AOP 306.

For example, the interval between a timestamp and a location determined from AP identifier list 228 or provided in location list 238 may exceed a threshold interval, indicating that this location is unreliable for determining a location of an observed electronic tag. Application processor 210 can determine that mobile device 302 is stationary during this interview using the motion information. In response, application processor 210 can increase a confidence value of the estimated location.

Exemplary Procedures

Figure 4:
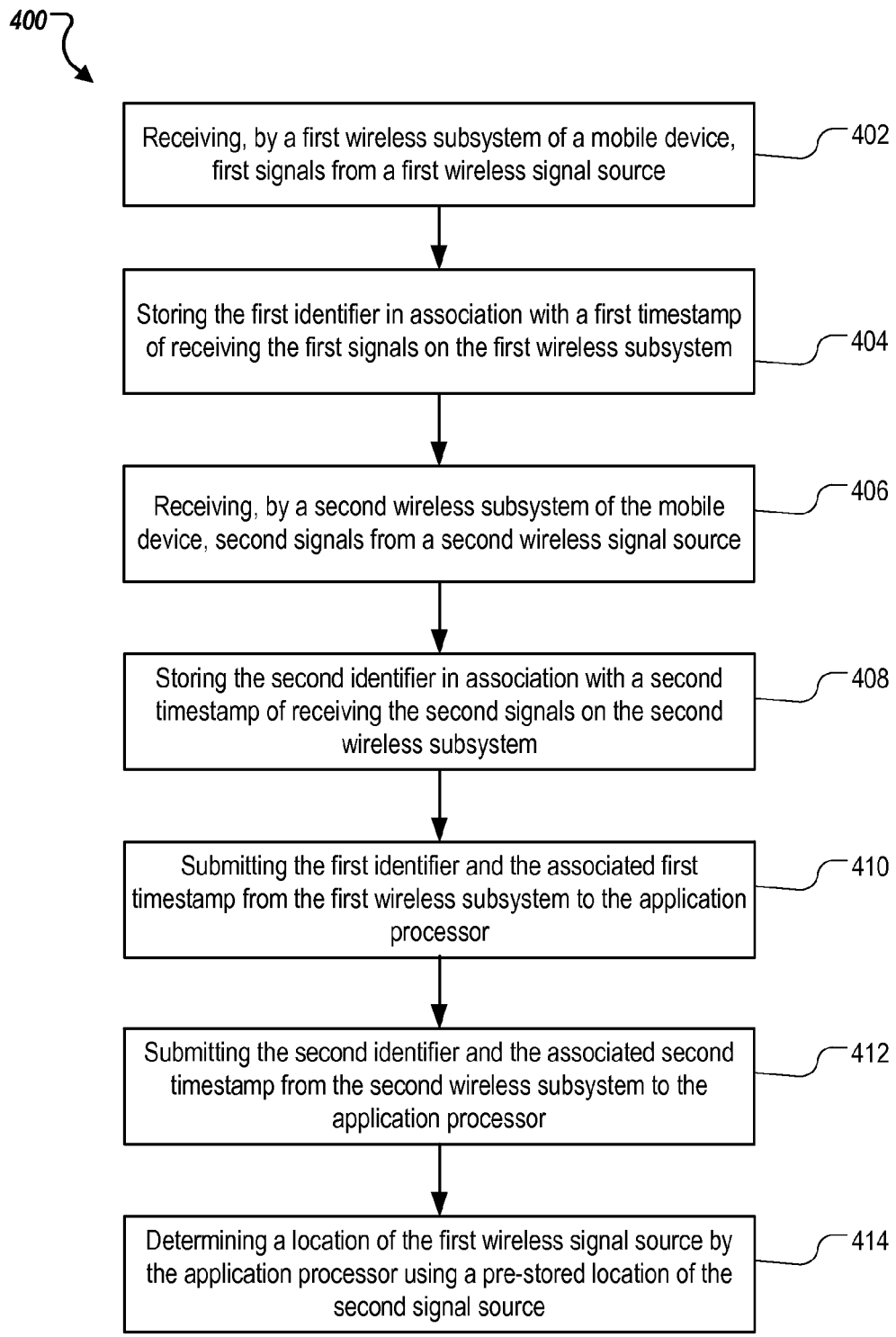
FIG. 4 is a flowchart of an exemplary process of determining a location of a tag.

FIG. 4 is a flowchart of exemplary process 400 of determining a location of a tag. Example mobile device 102 or example mobile device 302 can perform process 400.

A first wireless subsystem of a mobile device can receive (402) first signals from a first wireless signal source. The first wireless subsystem can be configured to monitor a personal area network (PAN). The first wireless subsystem can include a Bluetooth connectivity microchip. The first signals can indicate a first identifier of the first wireless signal source. The first signal source can be an electronic tag, for example, a BLE tag. The first identifier can be a tag identifier including a UUID of the BLE tag.

The first wireless subsystem can store (404) the first identifier in association with a first timestamp of receiving the first signals on the first wireless subsystem.

A second wireless subsystem of the mobile device can receive (406) second signals from a second wireless signal source. The second wireless subsystem can be a microchip configured to monitor a wireless local area network (WLAN). The second wireless subsystem includes a Wi-Fi™ processor. The second wireless signal source can be an AP. The second signals can indicate a second identifier of the second wireless signal source.

The second wireless subsystem can store (408) the second identifier in association with a second timestamp of receiving the second signals on the second wireless subsystem.

The first wireless subsystem can determine that a temporal condition provided by an application processor of the mobile device has been satisfied. The temporal condition can specify a time period at which the first wireless subsystem and the second wireless subsystem shall submit stored identifiers and associated timestamps to the application processor. Upon the determination, the first wireless subsystem can submit (410) the first identifier and the associated first timestamp from the first wireless subsystem to the application processor.

The second wireless subsystem can determine that the temporal condition has been satisfied at the second wireless subsystem. Upon the determination, the second wireless subsystem can submit (412) the second identifier and the associated second timestamp from the second wireless subsystem to the application processor. Submissions of the first and second identifiers and associated timestamps can cause activation of the application processor.

The application processor can determine (414) a location of the first wireless signal source using a pre-stored location of the second signal source. The pre-stored location can be associated with the second identifier. Determining the location of the first wireless signal source can include associating the pre-stored location of the second signal source with the first identifier according to a match between the first timestamp and the second timestamp. The mobile device can submit the first identifier, the location of the first wireless signal source and the timestamp associated with the first identifier from the mobile device to a server providing a lost-and-found service. The lost-and-found service can be a service programmed to locate a lost item to which the first wireless signal source is attached or to locate a lost person carrying the first wireless signal source.

In some implementations, the mobile device can execute process 400 using an additional or alternative architecture. Instead of or in addition to using the first wireless system, the mobile device can use a subsystem including a sensor for detecting audio signals (e.g., an ultrasonic sound signal), light signals (e.g., a visible light communication (VLC) signal), magnetic fields, or an radio frequency identification (RFID). An item can be tagged by a corresponding device, and associated with the first identifier accordingly. The processor can determine a location of the tag and the tagged item by performing the operations described above.

Figure 5:
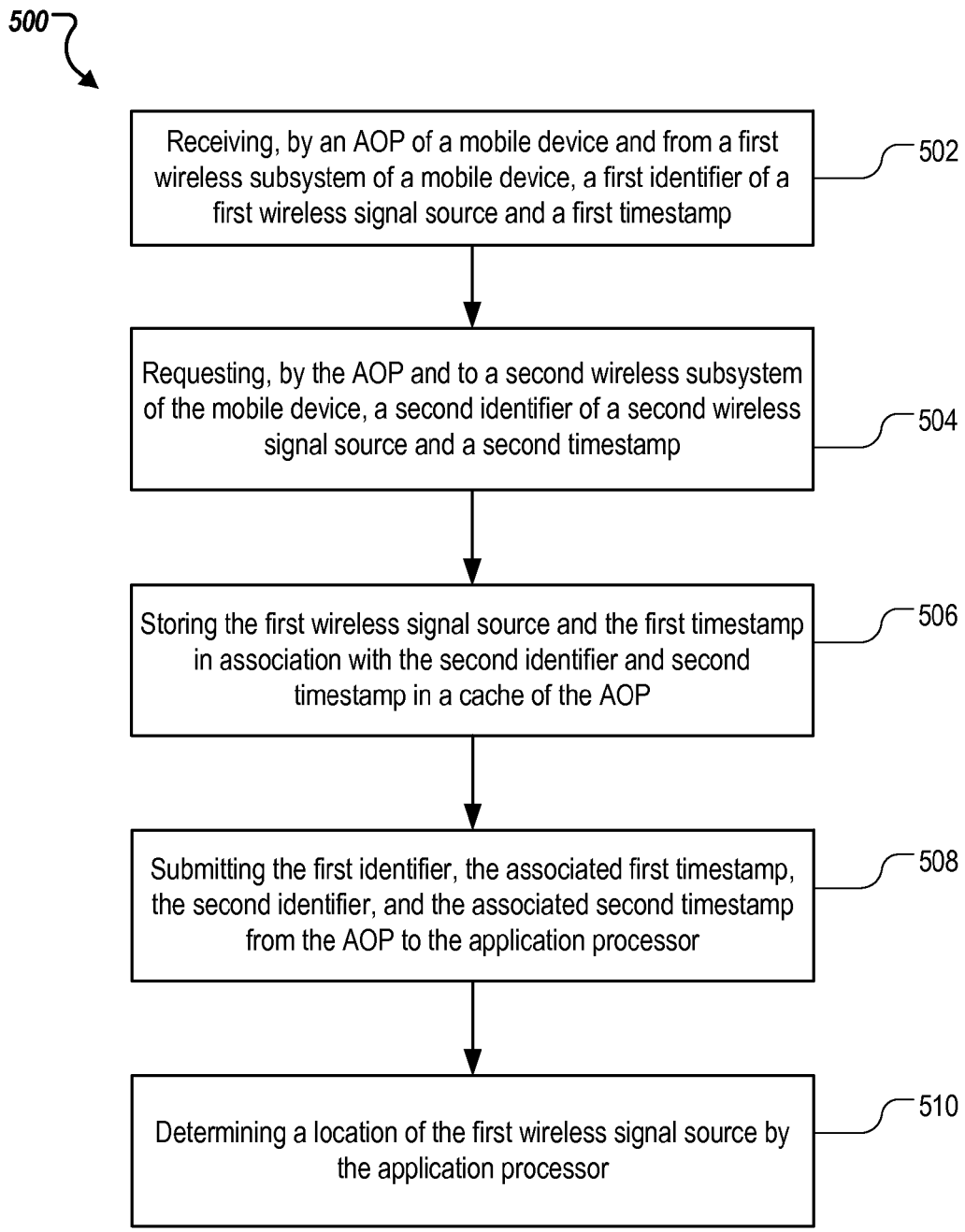
FIG. 5 is a flowchart of an exemplary process of determining a location of a tag.

FIG. 5 is a flowchart of exemplary process 500 of determining a location of a tag. Example mobile device 302 of FIG. 3 can perform process 500.

An AOP of a mobile device can receive (502) from a first wireless subsystem of the mobile device a first identifier of a first wireless signal source and a first timestamp indicating time the first wireless signal source is observed by the first wireless subsystem. The AOP can be a motion processor of the mobile device. The first wireless subsystem can include a Bluetooth connectivity microchip. The first signal source can be a BLE tag.

In response to receiving the first identifier and first timestamp, the AOP can request (504) to a second wireless subsystem of the mobile device, a second identifier of a second wireless signal source that has been observed by the second wireless subsystem. The second wireless subsystem includes a Wi-Fi processor. The second signal source can be an AP.

The AOP can receive, from the second wireless subsystem, the second identifier and a timestamp indicating time the second wireless signal source was observed by the second wireless subsystem. The second identifier can be among a list identifiers provided by the second wireless system in response to the request from the AOP. The second identifier can be an identifier in the list having a timestamp closest to the first timestamp. In response to receiving the second identifier and the associated timestamp, the AOP can store (506) the first wireless signal source and the first timestamp in association with the second identifier and second timestamp in a cache of the AOP. The cache can be a memory component built on a same microchip of the AOP.

The AOP can determine that a temporal condition provided by an application processor of the mobile device has been satisfied. In response, the AOP can submit (508) the first identifier, the associated first timestamp, the second identifier, and the associated second timestamp from the AOP to the application processor. In some implementations, upon receiving the first identifier, the AOP can submit a request for a location of the mobile device to a location subsystem of the mobile device that includes a GNSS receiver and optionally, a barometer. Upon determining that the temporal condition is satisfied, the AOP can submit the location to the application processor in association with the first identifier.

The application processor can determine (510) a location of the first wireless signal source using a pre-stored location of the second signal source. The pre-stored location can be a location associated with the second identifier. Determining the location of the first wireless signal source can include associating the pre-stored location of the second signal source with the first identifier according to a match between the first timestamp and the second timestamp. In some implementations, determining the location of the first wireless signal source can be based at least in part on a location provided by the location subsystem and submitted to the application processor by the AOP. The mobile device can submit the location of the first wireless signal source to a server that provides a lost-and-found service. The lost-and-found service can be a service programmed to locate a lost item to which the first wireless signal source is attached or to locate a lost person carrying the first wireless signal source.

In some implementations, the mobile device can execute process 500 using an additional or alternative architecture using audio signals, light signals, magnetic fields, or an RFID, as described above in reference to FIG. 4.

Exemplary Mobile Device Architecture

Figure 6:
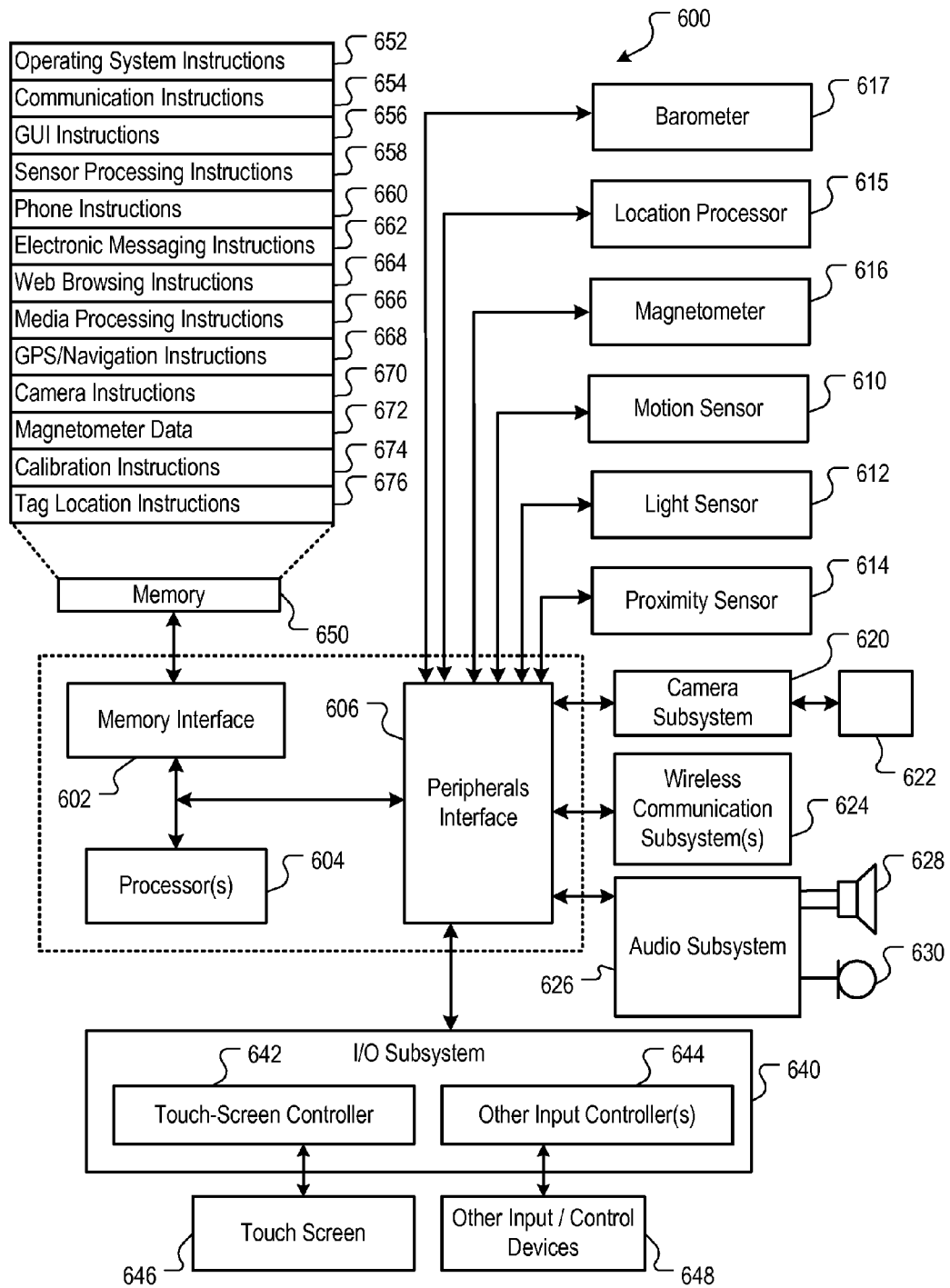
FIG. 6 is a block diagram illustrating an exemplary device architecture of a mobile device implementing the features and operations described in reference to FIGS. 1-5.

FIG. 6 is a block diagram illustrating an exemplary device architecture 600 of a mobile device implementing the features and operations described in reference to FIGS. 1-5. A mobile device (e.g., mobile device 102 or mobile device 302) can include memory interface 602, one or more data processors, image processors and/or processors 604 and peripherals interface 606. Memory interface 602, one or more processors 604 and/or peripherals interface 606 can be separate components or can be integrated in one or more integrated circuits. Processors 604 can include application processors, baseband processors and wireless processors. The various components in the mobile device, for example, can be coupled by one or more communication buses or signal lines.

Sensors, devices and subsystems can be coupled to peripherals interface 606 to facilitate multiple functionalities. For example, motion sensor 610, light sensor 612 and proximity sensor 614 can be coupled to peripherals interface 606 to facilitate orientation, lighting and proximity functions of the mobile device. Location processor 615 (e.g., GPS receiver) can be connected to peripherals interface 606 to provide geopositioning. Electronic magnetometer 616 (e.g., an integrated circuit chip) can also be connected to peripherals interface 606 to provide data that can be used to determine the direction of magnetic North. Thus, electronic magnetometer 616 can be used as an electronic compass. Motion sensor 610 can include one or more accelerometers configured to determine change of speed and direction of movement of the mobile device. Barometer 617 can include one or more devices connected to peripherals interface 606 and configured to measure pressure of atmosphere around the mobile device.

Camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which a mobile device is intended to operate. For example, a mobile device can include communication subsystems 624 designed to operate over a GSM network, a GPRS network, an EDGE network, a Wi-Fi™ or WiMax™ network and a Bluetooth™ network. In particular, the wireless communication subsystems 624 can include hosting protocols such that the mobile device can be configured as a base station for other wireless devices.

Audio subsystem 626 can be coupled to a speaker 628 and a microphone 630 to facilitate voice-enabled functions, such as voice recognition, voice replication, digital recording and telephony functions. Audio subsystem 626 can be configured to receive voice commands from the user.

I/O subsystem 640 can include touch surface controller 642 and/or other input controller(s) 644. Touch surface controller 642 can be coupled to a touch surface 646 or pad. Touch surface 646 and touch surface controller 642 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 646. Touch surface 646 can include, for example, a touch screen.

Other input controller(s) 644 can be coupled to other input/control devices 648, such as one or more buttons, rocker switches, thumb-wheel, infrared port, USB port and/or a pointer device such as a stylus. The one or more buttons (not shown) can include an up/down button for volume control of speaker 628 and/or microphone 630.

In one implementation, a pressing of the button for a first duration may disengage a lock of the touch surface 646; and a pressing of the button for a second duration that is longer than the first duration may turn power to the mobile device on or off. The user may be able to customize a functionality of one or more of the buttons. The touch surface 646 can, for example, also be used to implement virtual or soft buttons and/or a keyboard.

In some implementations, the mobile device can present recorded audio and/or video files, such as MP3, AAC and MPEG files. In some implementations, the mobile device can include the functionality of an MP3 player. Other input/output and control devices can also be used.

Memory interface 602 can be coupled to memory 650. Memory 650 can include high-speed random access memory and/or non-volatile memory, such as one or more magnetic disk storage devices, one or more optical storage devices and/or flash memory (e.g., NAND, NOR). Memory 650 can store operating system 652, such as iOS, Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 can include a kernel (e.g., UNIX kernel).

Memory 650 may also store communication instructions 654 to facilitate communicating with one or more additional devices, one or more computers and/or one or more servers. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes and instructions; camera instructions 670 to facilitate camera-related processes and functions; magnetometer data 672 and calibration instructions 674 to facilitate magnetometer calibration. The memory 650 may also store other software instructions (not shown), such as security instructions, web video instructions to facilitate web video-related processes and functions and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 650. Memory 650 can store context instructions 676 that, when executed by processor 604, can cause processor 604 to perform operations of an application processor as described above. These operations can include programming a Wi-Fi processor, a Bluetooth processor, or an AOP to perform various functions.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of the mobile device may be implemented in hardware and/or in software, including in one or more signal processing and/or application specific integrated circuits.

Exemplary Operating Environment

Figure 7:
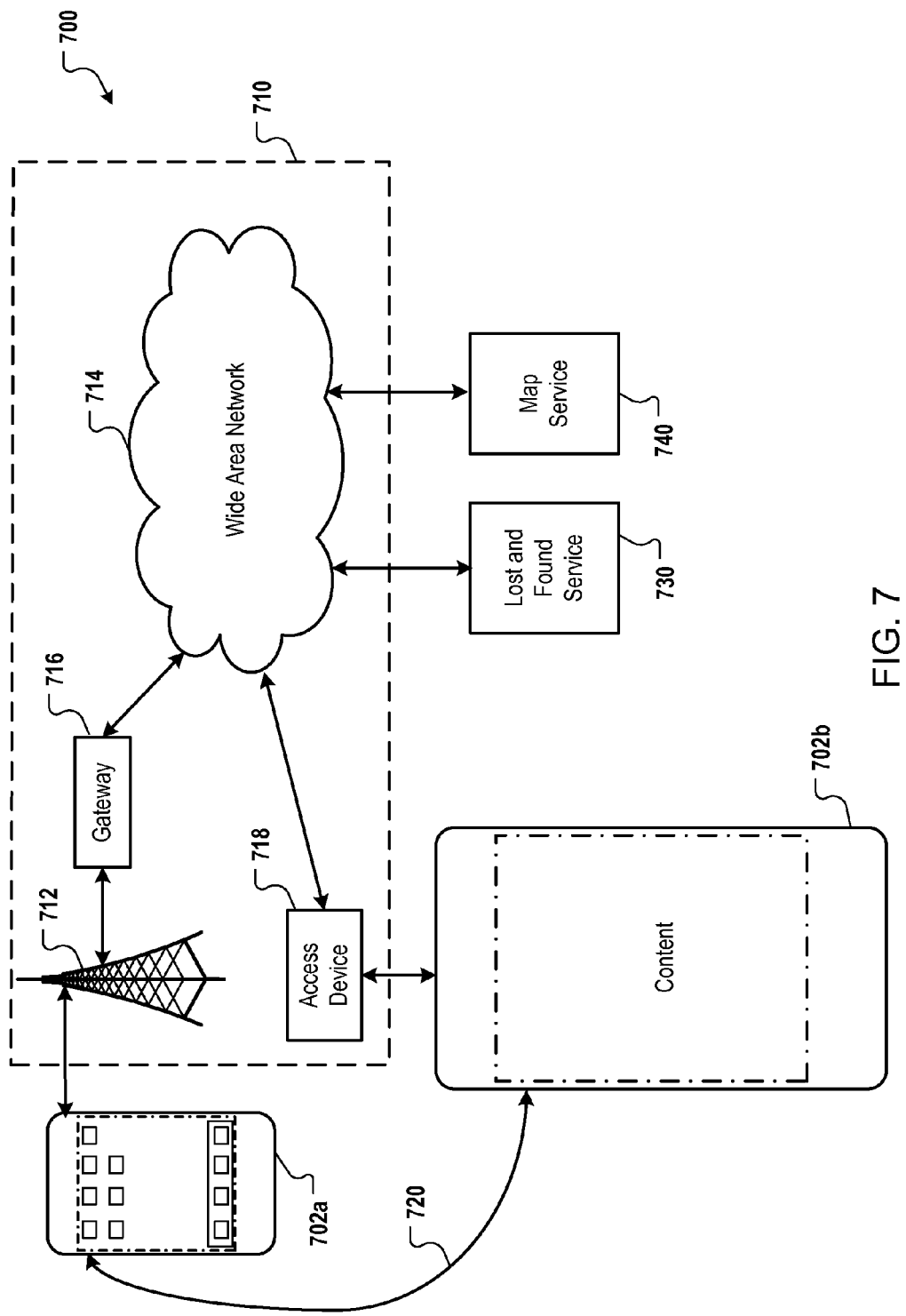
FIG. 7 is a block diagram of an exemplary network operating environment for the mobile devices of FIGS. 1-5.

FIG. 7 is a block diagram of an exemplary network operating environment 700 for the mobile devices of FIGS. 1-5. Mobile devices 702a and 702b can, for example, communicate over one or more wired and/or wireless networks 710 in data communication. For example, a wireless network 712, e.g., a cellular network, can communicate with a wide area network (WAN) 714, such as the Internet, by use of a gateway 716. Likewise, an access device 718, such as an 802.11g or 802.11n wireless access point, can provide communication access to the wide area network 714. Each of mobile devices 702a and 702b can be mobile device 102 or mobile device 302 as described above.

In some implementations, both voice and data communications can be established over wireless network 712 and the access device 718. For example, mobile device 702a can place and receive phone calls (e.g., using voice over Internet Protocol (VoIP) protocols), send and receive e-mail messages (e.g., using Post Office Protocol 3 (POP3)) and retrieve electronic documents and/or streams, such as web pages, photographs and videos, over wireless network 712, gateway 716 and wide area network 714 (e.g., using Transmission Control Protocol/Internet Protocol (TCP/IP) or User Datagram Protocol (UDP)). Likewise, in some implementations, the mobile device 702b can place and receive phone calls, send and receive e-mail messages and retrieve electronic documents over the access device 718 and the wide area network 714. In some implementations, mobile device 702a or 702b can be physically connected to the access device 718 using one or more cables and the access device 718 can be a personal computer. In this configuration, mobile device 702a or 702b can be referred to as a "tethered" device.

Mobile devices 702a and 702b can also establish communications by other means. For example, wireless device 702a can communicate with other wireless devices, e.g., other mobile devices, cell phones, etc., over the wireless network 712. Likewise, mobile devices 702a and 702b can establish peer-to-peer communications 720, e.g., a personal area network, by use of one or more communication subsystems, such as the Bluetooth™ communication devices. Other communication protocols and topologies can also be implemented.

The mobile device 702a or 702b can, for example, communicate with one or more services 730 and 740 over the one or more wired and/or wireless networks. For example, one or more lost-and-found services 730 can allow mobile devices 702a and 702b to monitor observed tags or to locate a lost or stolen item that is tagged. Map service 740 can provide information, e.g., a map and an address that can be used to display a last known location of a lost or stolen item located by the mobile devices 702a and 702b.

Mobile device 702a or 702b can also access other data and content over the one or more wired and/or wireless networks. For example, content publishers, such as news sites, Really Simple Syndication (RSS) feeds, web sites, blogs, social networking sites, developer networks, etc., can be accessed by mobile device 702a or 702b. Such access can be provided by invocation of a web browsing function or application (e.g., a browser) in response to a user touching, for example, a Web object.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations of the invention have been described. Nevertheless, it will be understood that various modifications can be made without departing from the spirit and scope of the invention.

What is claimed is:

1. A method comprising:
   receiving, by a first wireless subsystem of a mobile device, first signals from a first wireless signal source, the first wireless subsystem configured to monitor a personal area network (PAN), the first signals indicating a first identifier of the first wireless signal source;
   storing the first identifier in association with a first timestamp of receiving the first signals on the first wireless subsystem;
   receiving, by a second wireless subsystem of the mobile device, second signals from a second wireless signal source, the second wireless subsystem configured to monitor a wireless local area network (WLAN), the second signals indicating a second identifier of the second wireless signal source;
   storing the second identifier in association with a second timestamp of receiving the second signals on the second wireless subsystem;
   upon determining, by the first wireless subsystem, that a temporal condition provided by an application processor of the mobile device has been satisfied, submitting the first identifier and the associated first timestamp from the first wireless subsystem to the application processor;
   upon determining, by the second wireless subsystem, that the temporal condition has been satisfied, submitting the second identifier and the associated second timestamp from the second wireless subsystem to the application processor, wherein submissions of the first and second identifiers and associated timestamps cause activation of the application processor; and
   determining a location of the first wireless signal source by the application processor using a pre-stored location of the second signal source, the pre-stored location being associated with the second identifier, wherein determining the location of the first wireless signal source comprises associating the pre-stored location of the second signal source with the first identifier according to a match between the first timestamp and the second timestamp.

2. The method of claim 1, wherein:
   the first wireless subsystem includes a Bluetooth™ connectivity microchip, and
   the second wireless subsystem includes a Wi-Fi™ processor.

3. The method of claim 1, wherein:
   the first signal source is a Bluetooth low energy (BLE) tag, and
   the second signal source is a wireless access point.

4. The method of claim 1, wherein the temporal condition specifies a time period at which the first wireless subsystem and the second wireless subsystem submit stored identifiers and associated timestamps to the application processor.

5. The method of claim 1, comprising submitting the first identifier, the location of the first wireless signal source and the timestamp associated with the first identifier from the mobile device to a server providing a lost-and-found service.

6. A method comprising:
receiving, by an always-on processor (AOP) of a mobile device and from a first wireless subsystem of the mobile device, a first identifier of a first wireless signal source and a first timestamp indicating time the first wireless signal source is observed by the first wireless subsystem;
in response to receiving the first identifier and first timestamp, requesting, by the AOP and to a second wireless subsystem of the mobile device, a second identifier of a second wireless signal source that has been observed by the second wireless subsystem;
upon receiving, by the AOP and from the second wireless subsystem, the second identifier and a timestamp indicating time the second wireless signal source was observed by the second wireless subsystem, storing the first wireless signal source and the first timestamp in association with the second identifier and second timestamp in a cache of the AOP;
upon determining, by the AOP, that a temporal condition provided by an application processor of the mobile device has been satisfied, submitting the first identifier, the associated first timestamp, the second identifier, and the associated second timestamp from the AOP to the application processor; and
determining a location of the first wireless signal source by the application processor using a pre-stored location of the second signal source, the pre-stored location being associated with the second identifier, wherein determining the location of the first wireless signal source comprises associating the pre-stored location of the second signal source with the first identifier according to a match between the first timestamp and the second timestamp.

7. The method of claim 6, wherein:
the AOP is a motion processor of the mobile device,
the first wireless subsystem includes a Bluetooth™ connectivity microchip,
the second wireless subsystem includes a Wi-Fi™ processor,
the first signal source is a Bluetooth low energy (BLE) tag, and
the second signal source is a wireless access point.

8. The method of claim 6, wherein the second identifier is among a list identifiers provided by the second wireless subsystem in response to the requesting, the second identifier being an identifier having a timestamp closest to the first timestamp.

9. The method of claim 6, comprising:
upon receiving the first identifier, requesting, by the AOP and to a location subsystem of the mobile device that includes a global navigation satellite system (GNSS) receiver, a location of the mobile device, wherein the AOP submits the location to the application processor in association with the first identifier, and wherein determining the location of the first wireless signal source is based at least in part on the location provided by the location subsystem.

10. The method of claim 6, comprising submitting the location of the first wireless signal source to a server that provides a lost-and-found service that is programmed to locate a lost item to which the first wireless signal source is attached or to locate a lost person carrying the first wireless signal source.

11. A system comprising:
one or more processors; and
a non-transitory computer-readable medium storing instructions that, when executed by the one or more processors, cause the one or more processors to perform operations comprises:
receiving, by a first wireless subsystem of a mobile device, first signals from a first wireless signal source, the first wireless subsystem configured to monitor a personal area network (PAN), the first signals indicating a first identifier of the first wireless signal source;
storing the first identifier in association with a first timestamp of receiving the first signals on the first wireless subsystem;
receiving, by a second wireless subsystem of the mobile device, second signals from a second wireless signal source, the second wireless subsystem configured to monitor a wireless local area network (WLAN), the second signals indicating a second identifier of the second wireless signal source;
storing the second identifier in association with a second timestamp of receiving the second signals on the second wireless subsystem;
upon determining, by the first wireless subsystem, that a temporal condition provided by an application processor of the mobile device has been satisfied, submitting the first identifier and the associated first timestamp from the first wireless subsystem to the application processor;
upon determining, by the second wireless subsystem, that the temporal condition has been satisfied, submitting the second identifier and the associated second timestamp from the second wireless subsystem to the application processor, wherein submissions of the first and second identifiers and associated timestamps cause activation of the application processor; and
determining a location of the first wireless signal source by the application processor using a pre-stored location of the second signal source, the pre-stored location being associated with the second identifier, wherein determining the location of the first wireless signal source comprises associating the pre-stored location of the second signal source with the first identifier according to a match between the first timestamp and the second timestamp.

12. The system of claim 11, wherein:
the first wireless subsystem includes a Bluetooth™ connectivity microchip, and
the second wireless subsystem includes a Wi-Fi™ processor.

13. The system of claim 11, wherein:
the first signal source is a Bluetooth low energy (BLE) tag, and
the second signal source is a wireless access point.

14. The system of claim 11, wherein the temporal condition specifies a time period at which the first wireless subsystem and the second wireless subsystem submit stored identifiers and associated timestamps to the application processor.

15. The system of claim 11, the operations comprising submitting the first identifier, the location of the first wireless signal source and the timestamp associated with the first identifier from the mobile device to a server providing a lost-and-found service.

16. A non-transitory computer-readable medium storing instructions that, when executed by one or more processors, cause the one or more processors to perform operations comprising:
receiving, by an always-on processor (AOP) of a mobile device and from a first wireless subsystem of the mobile device, a first identifier of a first wireless signal source and a first timestamp indicating time the first wireless signal source is observed by the first wireless subsystem;
in response to receiving the first identifier and first timestamp, requesting, by the AOP and to a second wireless subsystem of the mobile device, a second identifier of a second wireless signal source that has been observed by the second wireless subsystem;
upon receiving, by the AOP and from the second wireless subsystem, the second identifier and a timestamp indicating time the second wireless signal source was observed by the second wireless subsystem, storing the first wireless signal source and the first timestamp in association with the second identifier and second timestamp in a cache of the AOP;
upon determining, by the AOP, that a temporal condition provided by an application processor of the mobile device has been satisfied, submitting the first identifier, the associated first timestamp, the second identifier, and the associated second timestamp from the AOP to the application processor; and
determining a location of the first wireless signal source by the application processor using a pre-stored location of the second signal source, the pre-stored location being associated with the second identifier, wherein determining the location of the first wireless signal source comprises associating the pre-stored location of the second signal source with the first identifier according to a match between the first timestamp and the second timestamp.

17. The non-transitory computer-readable medium of claim 16, wherein:
the AOP is a motion processor of the mobile device,
the first wireless subsystem includes a Bluetooth™ connectivity microchip,
the second wireless subsystem includes a Wi-Fi™ processor,
the first signal source is a Bluetooth low energy (BLE) tag, and
the second signal source is a wireless access point.

18. The non-transitory computer-readable medium of claim 16, wherein the second identifier is among a list identifiers provided by the second wireless subsystem in response to the requesting, the second identifier being an identifier having a timestamp closest to the first timestamp.

19. The non-transitory computer-readable medium of claim 16, the operations comprising:
upon receiving the first identifier, requesting, by the AOP and to a location subsystem of the mobile device that includes a global navigation satellite system (GNSS) receiver, a location of the mobile device, wherein the AOP submits the location to the application processor in association with the first identifier, and wherein determining the location of the first wireless signal source is based at least in part on the location provided by the location subsystem.

20. The non-transitory computer-readable medium of claim 16, the operations comprising submitting the location of the first wireless signal source to a server that provides a lost-and-found service that is programmed to locate a lost item to which the first wireless signal source is attached or to locate a lost person carrying the first wireless signal source.

\* \* \* \* \*